Oct. 29, 1929.    V. F. GARCIA    1,733,789
DEVICE FOR SMOOTHING GROUND
Filed Nov. 26, 1927

INVENTOR
Victor F. Garcia
BY
ATTORNEY

Patented Oct. 29, 1929

1,733,789

UNITED STATES PATENT OFFICE

VICTOR F. GARCIA, OF LAREDO, TEXAS

DEVICE FOR SMOOTHING GROUND

Application filed November 26, 1927. Serial No. 235,819.

This invention relates to a new and useful device in the nature of a ground smoothing tool, especially adapted for smoothing or leveling ground, cement, concrete or the like.

The object of the invention is to provide a ground smoothing tool of the class described of novel construction and arrangement of parts hereinafter more fully described, claimed and illustrated in the accompanying drawing.

Figure 1:
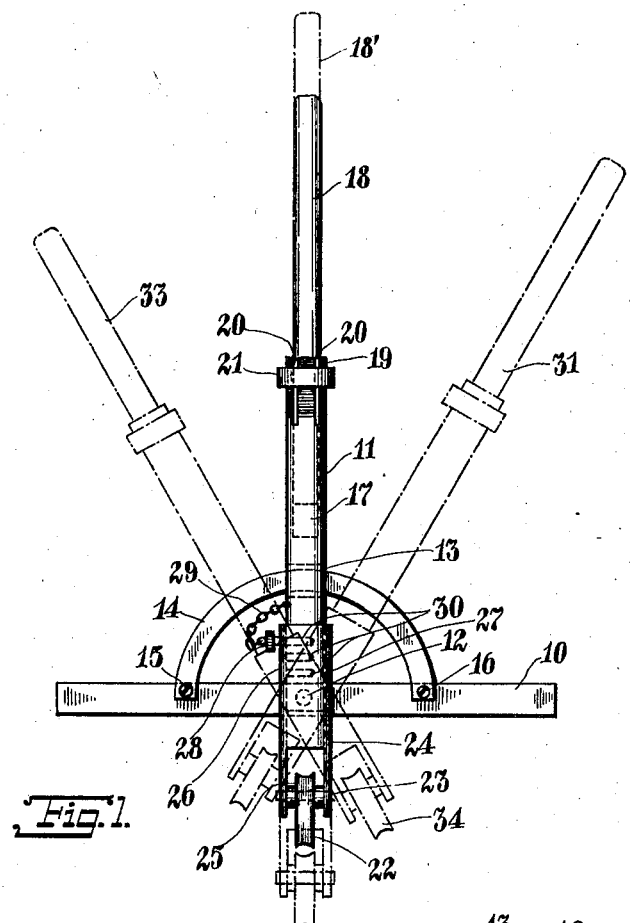
Fig. 1 is a front elevational view of my improved tool.
Figure 2:
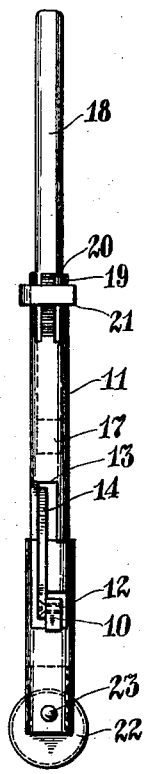
Fig. 2 is a side elevational view thereof.

As here embodied my improved tool comprises a bar 10 of straight edge, horizontally displaced. The rod 11 is pivotally attached, as at 12, at its lower extremity to the center portion of the bar 10, and is provided with an intermediate opening 13, adapted to receive the segment member 14, attached as at 15 and 16, at both extremities to the bar 10, equi-distant from the pivot pin 12. The rod 11 is provided with a cavity 17, at the upper portion thereof, adapted to slidably receive the lower portion of the handle member 18. The upper extremity of the rod 11, is threaded, as at 19, externally, and has formed therein a plurality of elongated slots 20. The collar 21 is threaded internally, adjustably engaging the said threads 19, as a means of securely holding the handle member 18 in any desired extended position.

The wheel 22 or roller is rotatively mounted on the shaft 23, secured to the lower portion of the tubular member 24, which has formed therein an elongated opening 25, adapted to receive a portion of the wheel 22. The tubular member 24 is adapted to slidably engage over the lower portion of the rod 11, and has formed therein elongated openings 26 and 27, adapted to receive the above mentioned bar 10. The pin 28 is secured by the flexible member 29, preferably a chain, to the rod 11, and is adapted to engage in an aperture formed in the upper portion of the tubular member 24 and in any desired one of the apertures 30, formed in the lower portion of the rod 11, as a means of securely holding the wheel 22 in any desired extended position below the bar 10.

It will be understood that the above described construction is such as will permit the handle member 18 and the wheel 22 to be pivoted or hinged to the right or to the left, as designated by the reference numerals 31 and 32, 33 and 34.

The manipulation and use of my improved ground smoothing tool are as follows:—The handle member 10 is gripped by the hands of the person using my device permitting the straight edge 10 to be drawn over the ground, concrete, cement or the like to be leveled on the surface thereof. The wheel 22 may be held in any desired extended position and angular position below the straight edge 10, permitting the said wheel to form or cut an indentation or line in the surface of the material being leveled which is especially desirable and required in the leveling of cement or concrete surfaces so as to permit a different colour cement to be entered into the cut for simulating that the surface is formed of blocks held together by this filler cement. My improved device may be manually drawn over the surface to be leveled in longitudinal and transverse relative positions for the purpose of striking off the surface thereof, and forming indentations or lines, as above set forth, at relative right angles so as to strike off the said surface in squares or rectangles for the purpose as above set forth. This applies particularly to cement or concrete sidewalks, yards, basements, or building floors of cement or concrete, or wherever comparatively large cement or concrete surfaces are desired. The cement filled into these cuts is held against possible vertical displacement by reason of the angular position of the cuts.

Figure 3:
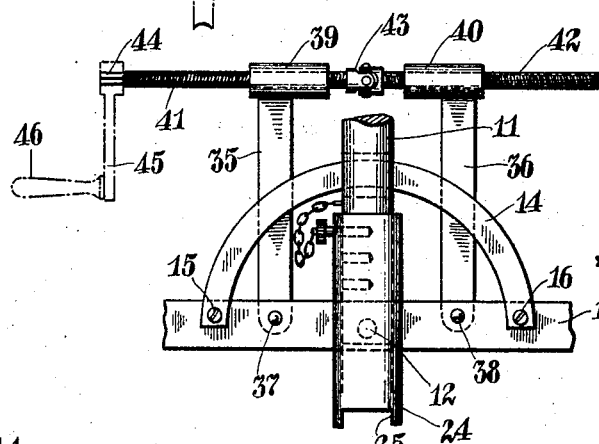
Fig. 3 is an enlarged fragmentary view illustrating a further development thereof.
Figure 4:
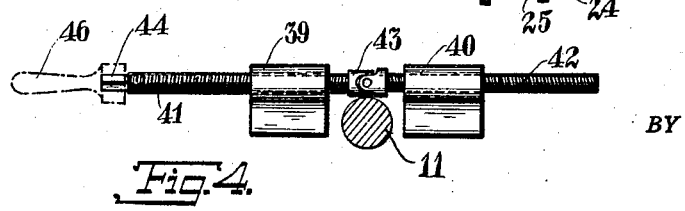
Fig. 4 is a top plan view thereof.

In Figs. 3 and 4 of the accompanying drawing, I have shown a pair of levers 35 and 36 pivotally attached, at their lower extremities as at 37 and 38, respectively, to the above mentioned bar 10, in proximity to the pivot point 12 at either side thereof, equi-distant therefrom. The levers 35 and 36 are provided with enlarged upper extended portions 39 and 40, adapted to normally engage the lower portion of the rod 11, at opposite sides thereof, so as to normally hold the handle member 18 in a vertically extended position. The enlarged portions 39 and 40 of the levers 35 and 36, have formed therein threaded apertures adapted to receive the threaded rods 41 and 42, respectively. The said rods 41 and 42, are provided with right and left hand threads. The rod 41 is attached to the rod 42, by means of the conventional universal joint 43. The rod 41 is provided with a square extremity 44, adapted to removably receive a crank 45, provided with a handle element 46, or the usual wrench, as a means of rotating the rods 41 and 42, so as to permit the handle member 18 to be pivoted, to the right and to the left, any desired equal amount.

Having thus described my invention, what I claim as new and desire to protect by Letters Patent of the United States is as follows:

1. In a device for smoothing ground, a straight edge bar pivotally attached on a rod, a pair of levers pivotally attached at their lower ends on the said bar at opposite sides of the bar's pivot point and at equal distances therefrom, and formed with enlarged top extremities, a rod threadedly engaged in each of the said enlarged extremities and formed with opposite-hand threads, a universal joint connecting the adjacent ends of the said rods, one of the said rods having its outer end arranged for receiving a turning tool, and the first mentioned rod being disposed between the said enlarged extremities which act as stops to limit its motion.

2. In a device for smoothing ground, a straight edge bar pivotally attached on a rod, a pair of levers pivotally attached at their lower ends on the said bar at opposite sides of the bar's pivot point and at equal distances therefrom and formed with enlarged top extremities, a rod threadedly engaged in each of the said enlarged extremities and formed with opposite-hand threads, a universal joint connecting the adjacent ends of the said rods, said rods being arranged for rotation, and the first mentioned rod being disposed between the said enlarged extremities which act as stops to limit its motion.

In testimony whereof I have affixed my signature.

VICTOR F. GARCIA.